May 28, 1940.                D. H. BUCKLEY                2,202,308
                          SLUDGE REMOVING DEVICE
                           Filed April 10, 1939
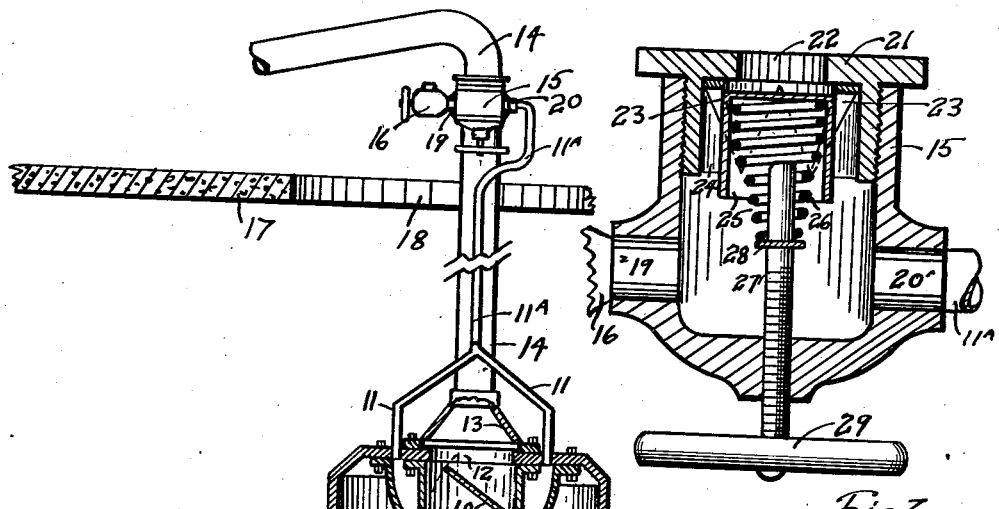
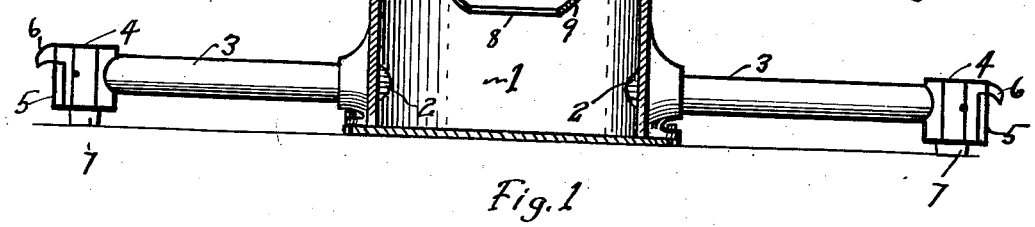
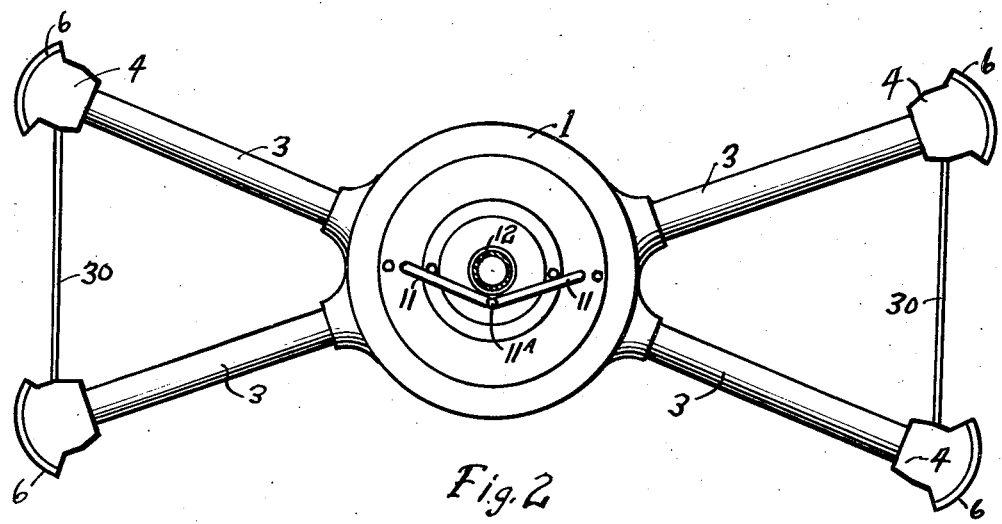
Duer H. Buckley
INVENTOR.
BY   W. B. Harpman
              ATTORNEY.

Patented May 28, 1940

2,202,308

UNITED STATES PATENT OFFICE 2,202,308

SLUDGE REMOVING DEVICE

Duer H. Buckley, Warren, Ohio, assignor to Sanitary Service Inc., Dover, Del., a corporation of Delaware Application April 10, 1939, Serial No. 267,003

5 Claims. (Cl. 210—209)

This invention relates to a sludge removing device.

The principal object of this invention is the provision of means for effectively removing the sludge from a septic tank without disturbing the liquid in the said tank.

A further object of this invention is the provision of a device adapted to effectively remove sludge from a septic tank and incorporating means for accurately controlling the rate of flow through the device so as to limit its operation to the removal of sludge.

A still further object of this invention is the provision of a sludge removing device relatively light in weight and portable so that it may be conveniently moved from one location to another.

In maintaining septic tanks at their highest degree of efficiency and particularly the large tanks frequently found in centralized rural schools, it has been determined that the natural accumulation of sludge in the said tanks is detrimental to the efficient operation thereof and it has been found necessary to remove this accumulated sludge at regular intervals. The device shown and described herein has been designed for the removal of this harmful sludge without affecting the liquid contents of the septic tanks in any way; it being only necessary to place the device on the bottom of the tank by inserting it through the man hole provided in the top of the tank, in which position it will effectively remove the majority of the sludge from the tank while confining its operation to the sludge area and enabling the operators to control the flow of sludge through the device by a convenient air valve. In the event that the power source used in pumping the sludge through the device operates at an uneven speed, the resulting pumping action through the device might possibly increase to the point where the majority of the sludge immediately adjacent to the suction ports of the device is removed and results in the subsequent flow of liquid into and through the device. In order to prevent this from occurring, an automatic air valve has been incorporated in the device and will effectively admit air into the suction chamber of the device so as to effectively control the flow of sludge or liquid through the device. In the event that liquid enters the device, it is only necessary for the operators to open a control valve which also admits air to the suction chamber of the device and effectively stops the flow of the liquid and allows the sludge to flow back around the suction ports thereof. When the power source results in uneven cycles of pumping action, the automatic air valve is adapted to open and admit air to the suction chamber of the device in direct relation to the increase in pumping action through the device thus tending to keep the pumping action through the device at a constant even level and prevent the above mentioned undesirable pumping of liquid.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

Fig. 1 is a side elevation with parts and cross section showing the device positioned upon the floor of a septic tank.

Fig. 2 is a top plan view of the device and shows the relative positions of the various suction ports thereof.

Fig. 3 is an enlarged detail of an automatic air valve shown in Fig. 1.

By referring to the drawing and Figs. 1 and 2 in particular, it will be seen that the invention comprises a suction chamber 1 having a plurality of openings 2 formed in the sides and near the bottom thereof. A plurality of tubes 3 are shown positioned in these openings 2, the tubes 3 extending outwardly where each terminates in a suction port 4. These suction ports 4 comprise box-like structures positioned upon the ends of the tubes 3, each suction port being provided with a grilled opening 5 adapted to admit sludge thereinto. A projecting apron 6 is positioned above and extends outwardly and downwardly over the grilled opening 5 and helps to prevent liquid above the sludge area from entering these grilled openings 5. Each of the suction ports 4 is provided with a foot 7 so as to position it slightly above the bottom of the septic tank.

When the sludge flows inwardly through the various suction ports 4 through the tubes 3 and into the suction chamber 1 it must rise upwardly through a central opening 8 in a bowl-like baffle 9 and through a foot valve 10 positioned within and above this bowl-like baffle 9. Both the bowl-like baffle 9 and foot valve 10 are bolted to the inside of the suction chamber 1 and a pair of air-admitting tubes 11 enter the suction chamber 1 in the area between the bowl-like baffle 9 and foot valve 10. These air-admitting tubes 11 continue upwardly and join together where a single air-admitting flexible tube 11ª continues upwardly to a control unit. Positioned on the upper surface of the suction chamber 1 and directly over an opening 12 therein, there is a reducing flange 13 which is provided at its top with suitable connection means for connecting a flexible suction hose 14 thereto. This flexible suction hose 14 may be formed of any non-collapsible flexible structure and extends upwardly out of the septic tank where a diaphragm pump may be attached.

In order to control the pumping action through the device, an automatic air valve 15 has been provided and is shown in Fig. 1 attached to the flexible hose 14 by suitable clamps. This automatic air-valve 15 has a standard manually controlled valve 16 turned into one side thereof and thus provides for manual as well as automatic control of air admitted to the suction chamber 1 through the air-admitting tubes 11ª and 11. This air control means and the upper end of the flexible hose 14 to which it is attached are adapted to be positioned above the top 17 of the septic tank, the various tubular connections extending downwardly through the man-hole 18.

By referring to Fig. 3 an enlarged detail of the automatic air control valve is shown, wherein it will be seen that the valve comprises a cylindrical body 15 having a pair of openings 19 and 20 which are adapted to receive the manual control valve 16 and the air-admitting tube 11ª respectively. The upper end of this valve 15 is threaded on its inner surface and adapted to receive a top portion 21 which in turn has a centrally positioned opening 22 therein and is provided with a plurality of inverted V shaped slots 23 positioned around its inner depending portion 24. Slidably positioned within this inner depending portion 24, there is a piston 25 which is positioned upon a coil spring 26 which is in turn positioned upon the upper end of a threaded screw 27 by means of a bracket 28 attached thereto. This threaded screw 27 extends downwardly through a threaded opening in the bottom portion of a valve 15 and has a convenient wheel 29 positioned on its lower end. It will be seen that by rotating this wheel 29 the resulting action will be to move the piston 25 vertically within the depending portion 24 of the top portion 21. When this piston 25 moves downwardly the inverted V shaped slots 23 in the depending portion 24 will be uncovered and serve to admit air downwardly through the centrally positioned opening 22 and downwardly through the inverted V shaped slots 23 where the air continues out through the opening 20 in the valve 15 and downwardly through the air-admitting tubes 11ª and 11 and into the suction chamber 1 where it will effectively reduce the pumping action on any material passing through the device. It will be seen that additional air may be manually admitted to the valve 15 and to the suction chamber 1 by opening the manually controlled valve 16. This would be necessary in the event that the device started to pump liquid and the air admitting action of the automatic valve 15 was not sufficient to stop this pumping of liquid. The piston 25 in the automatic valve 15 in effect floats upon the coil spring 26 so that unevenness in the pumping action through the device will cause the piston 25 to move downwardly and admit additional air through the inverted V shaped slots 23. In this connection it will be seen that due to the shape of these inverted V shaped slots 23 the air admitted therethrough is increased in volume as the piston 25 moves downwardly as a wider portion of the slot is available.

It will be understood that it is necessary to keep the construction of this sludge removing device as light in weight as possible so that it may be readily portable. By referring again to Fig. 2, it will be seen that brace rods 30 have been positioned between the pairs of suction ports 4 and serve to add structural strength to the device. These brace rods 30 may also be used as convenient holds in placing in or removing the device from a septic tank.

What I claim is:

1. A sludge removing device comprising a suction chamber, a plurality of suction tubes positioned around and extending from the said suction chamber, a suction port positioned on the outer end of each of the said plurality of suction tubes, an opening in the top of the said suction chamber, a flexible hose connected to the said suction chamber and communicating therewith by means of the said opening, means for admitting air into the said suction chamber comprising a tube opening into the said suction chamber and leading to a control valve.

2. A sludge removing device comprising a suction chamber, a plurality of openings formed in the sides of the said suction chamber, suction tubes positioned in the said openings, a suction port positioned on each of the said suction tubes so as to admit sludge thereinto, a flexible hose attached to and communicating with the said suction chamber, means for admitting air to the said suction chamber to control the flow of sludge therethrough, said means comprising an air admitting tube attached to and communicating with the said suction chamber and extended to a control valve.

3. A sludge removing device comprising a suction chamber having a plurality of sludge admitting openings formed therein, a tubular connection to a pump attached to and communicating with the said suction chamber, air admitting tubes attached to and communicating with the said suction chamber so as to admit air thereto, valves positioned on the said air admitting tubes adapted to control the flow of air therethrough.

4. A sludge removing device comprising a suction chamber adapted to be placed in a septic tank, a plurality of suction tubes leading from the said suction chamber, suction ports formed on the ends of the said suction tubes and adapted to permit sludge to pass thereinto, a flexible hose attached to and communicating yith the said suction chamber, a bowl-like baffle positioned around the opening of the said flexible hose, an air admitting tube attached to and communicating with the said suction chamber, and opening into the said suction chamber inside the area of the said bowl-like baffle, the said air admitting tube and flexible hose leading to points outside the septic tank, where an air valve is positioned on the air admitting tube and a pump attached to the said flexible hose.

5. A sludge removing device comprising a suction chamber adapted to be placed in a septic tank, a plurality of suction tubes positioned around and communicating with the said suction chamber, a suction port positioned on the end of each of the said plurality of suction tubes, a central opening in the top of the said suction chamber, a depending cylindrical foot valve positioned below the said opening, a bowl-like baffle positioned around the said opening and around the said foot valve, air admitting openings positioned in the top of the said suction chamber and between the said bowl-like baffle and the said foot valve structure, air admitting tubes attached to and communicating with the said air admitting openings, a flexible hose attached to and communicating with the said suction chamber, through the said opening, together with valves on the said air admitting tubes adapted to control the air admitted into the said suction chamber, and a pump attached to the said flexible hose and adapted to pump sludge through the device.

DUER H. BUCKLEY.